US009084003B1

(12) United States Patent  
Sanio et al.

(10) Patent No.: US 9,084,003 B1  
(45) Date of Patent: Jul. 14, 2015

(54) METHODS, SYSTEMS, AND MEDIA FOR MEDIA PLAYBACK

(71) Applicant: Google Inc., Mountain View, CA (US)

(72) Inventors: Jason Robert Richard Sanio, Mountain View, CA (US); Courtney Hampson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/309,683

(22) Filed: Jun. 19, 2014

(51) Int. Cl.
*H04N 7/18* (2006.01)
*H04N 21/41* (2011.01)
*H04N 21/436* (2011.01)
*H04N 21/422* (2011.01)
*H04N 21/4363* (2011.01)
*H04N 7/173* (2011.01)

(52) U.S. Cl.
CPC ..... *H04N 21/4126* (2013.01); *H04N 21/42204* (2013.01); *H04N 21/436* (2013.01); *H04N 7/17318* (2013.01); *H04N 21/43615* (2013.01); *H04N 21/43632* (2013.01); *H04N 21/43635* (2013.01)

(58) Field of Classification Search
CPC ............... H04N 21/42204; H04N 21/43615; H04N 21/43632; H04N 21/43635; H04N 7/17318
See application file for complete search history.

(56) References Cited

U.S. PATENT DOCUMENTS

| 7,983,614 | B2 | 7/2011 | Dunko et al. | |
|---|---|---|---|---|
| 8,412,798 | B1 | 4/2013 | Wang | |
| 8,528,014 | B2 * | 9/2013 | Reynolds et al. | 725/30 |
| 2006/0053447 | A1 * | 3/2006 | Krzyzanowski et al. | 725/40 |
| 2008/0299893 | A1 | 12/2008 | Park | |
| 2009/0241149 | A1 * | 9/2009 | Yoshioka et al. | 725/87 |
| 2010/0205628 | A1 | 8/2010 | Davis et al. | |
| 2011/0058787 | A1 | 3/2011 | Hamada | |
| 2011/0161998 | A1 | 6/2011 | Alberth et al. | |
| 2011/0309933 | A1 | 12/2011 | Marino | |

FOREIGN PATENT DOCUMENTS

WO WO/2014/016705 12/2014

OTHER PUBLICATIONS

Notice of Allowance dated Oct. 9, 2014 in U.S. Appl. No. 13/602,914.
Office Action dated Apr. 16, 2014 in U.S. Appl. No. 13/602,914.
U.S. Appl. No. 13/602,914, filed Sep. 4, 2012.

* cited by examiner

*Primary Examiner* — Nathan Flynn
*Assistant Examiner* — James R Marandi
(74) *Attorney, Agent, or Firm* — Byrne Poh LLP

(57) ABSTRACT

Methods, systems, and media for media playback are provided. In some implementations, the method comprises: receiving location information indicating proximities of a mobile device with a plurality of media playback devices; determining that the mobile device is within a predetermined proximity of a first media playback device; transmitting first instructions to the first media playback device that cause a media content item to be presented on the first media playback device; determining that the mobile device is within the predetermined proximity of a second media playback device and is no longer within the predetermined proximity of the first media playback device; transmitting second instructions to the first media playback device that cause the first media playback device to stop presenting the media content item and third instructions to the second media playback device that cause the media content item to be presented on the second media playback device.

21 Claims, 5 Drawing Sheets

US 9,084,003 B1

METHODS, SYSTEMS, AND MEDIA FOR MEDIA PLAYBACK

TECHNICAL FIELD

The disclosed subject matter relates to methods, systems, and media for media playback.

BACKGROUND

Many users want to stream media content (such as music, videos, movies, television programs, etc.) from their mobile phone to a larger display, such as a television. However, users sometimes move around their environment while streaming the media content. For example, a user might move around their home (e.g., from a living room to a bedroom, etc.) while streaming media content. In such instances, it can be frustrating for a user to either miss viewing portions of the media content they are streaming when they are out of view of the playback device, or to have to manually cause the media content to be streamed to a second device in different new room.

Accordingly, it is desirable to provide new methods, systems, and media for media playback.

SUMMARY

Methods, systems, and media for media playback are provided. In accordance with some implementations of the disclosed subject matter, methods for media playback are provided, the methods comprising: receiving an indication that a mobile device is associated with a plurality of media playback devices over a wireless communications network, wherein the mobile device and the plurality of media playback devices are authenticated with a user account; receiving location information indicating relative proximities of the mobile device with each of the media playback devices; receiving a request to present a media content item on at least one of the plurality of media playback devices; determining that the mobile device is within a predetermined proximity of a first media playback device of the plurality of media playback devices based on the received location information; in response to determining that the mobile device is within the predetermined proximity of the first media playback device, transmitting first instructions to the first media playback device that cause the first media playback device to turn on and cause the media content item to be presented on the first media playback device at a first playback position; determining, at a second playback position during the playback of the media content item on the first media playback device, that the mobile device is within the predetermined proximity of a second media playback device and is no longer within the predetermined proximity of the first media playback device based on the received location information; and in response to determining that the mobile device is within the predetermined proximity of the second media playback device and is no longer within the predetermined proximity of the first media playback device, transmitting second instructions to the first media playback device that cause the first media playback device to stop presenting the media content item and third instructions to the second media playback device that cause the second media playback device to turn on and cause the media content item to be presented on the second media playback device at a second playback position.

In accordance with some implementations of the disclosed subject matter, systems for media playback are provided, the systems comprising: a hardware processor that is configured to: receive an indication that a mobile device is associated with a plurality of media playback devices over a wireless communications network, wherein the mobile device and the plurality of media playback devices are authenticated with a user account; receive location information indicating relative proximities of the mobile device with each of the media playback devices; receive a request to present a media content item on at least one of the plurality of media playback devices; determine that the mobile device is within a predetermined proximity of a first media playback device of the plurality of media playback devices based on the received location information; in response to determining that the mobile device is within the predetermined proximity of the first media playback device, transmit first instructions to the first media playback device that cause the first media playback device to turn on and cause the media content item to be presented on the first media playback device at a first playback position; determine, at a second playback position during the playback of the media content item on the first media playback device, that the mobile device is within the predetermined proximity of a second media playback device and is no longer within the predetermined proximity of the first media playback device based on the received location information; and in response to determining that the mobile device is within the predetermined proximity of the second media playback device and is no longer within the predetermined proximity of the first media playback device, transmit second instructions to the first media playback device that cause the first media playback device to stop presenting the media content item and third instructions to the second media playback device that cause the second media playback device to turn on and cause the media content item to be presented on the second media playback device at a second playback position.

In accordance with some implementations of the disclosed subject matter, non-transitory computer-readable media containing computer executable instructions that, when executed by a processor, cause the processor to perform a method for media playback are provided, the method comprising: receiving an indication that a mobile device is associated with a plurality of media playback devices over a wireless communications network, wherein the mobile device and the plurality of media playback devices are authenticated with a user account; receiving location information indicating relative proximities of the mobile device with each of the media playback devices; receiving a request to present a media content item on at least one of the plurality of media playback devices; determining that the mobile device is within a predetermined proximity of a first media playback device of the plurality of media playback devices based on the received location information; in response to determining that the mobile device is within the predetermined proximity of the first media playback device, transmitting first instructions to the first media playback device that cause the first media playback device to turn on and cause the media content item to be presented on the first media playback device at a first playback position; determining, at a second playback position during the playback of the media content item on the first media playback device, that the mobile device is within the predetermined proximity of a second media playback device and is no longer within the predetermined proximity of the first media playback device based on the received location information; and in response to determining that the mobile device is within the predetermined proximity of the second media playback device and is no longer within the predetermined proximity of the first media playback device, transmitting second instructions to the first media playback device that cause the first media playback device to stop presenting the media content item and third instructions to the second media playback device that cause the second media playback device to turn on and cause the media content item to be presented on the second media playback device at a second playback position.

In accordance with some implementations of the disclosed subject matter, a system for media playback is provided, the system comprising: means for receiving an indication that a mobile device is associated with a plurality of media playback devices over a wireless communications network, wherein the mobile device and the plurality of media playback devices are authenticated with a user account; means for receiving location information indicating relative proximities of the mobile device with each of the media playback devices; means for receiving a request to present a media content item on at least one of the plurality of media playback devices; means for determining that the mobile device is within a predetermined proximity of a first media playback device of the plurality of media playback devices based on the received location information; in response to determining that the mobile device is within the predetermined proximity of the first media playback device, means for transmitting first instructions to the first media playback device that cause the first media playback device to turn on and cause the media content item to be presented on the first media playback device at a first playback position; means for determining, at a second playback position during the playback of the media content item on the first media playback device, that the mobile device is within the predetermined proximity of a second media playback device and is no longer within the predetermined proximity of the first media playback device based on the received location information; and in response to determining that the mobile device is within the predetermined proximity of the second media playback device and is no longer within the predetermined proximity of the first media playback device, means for transmitting second instructions to the first media playback device that cause the first media playback device to stop presenting the media content item and third instructions to the second media playback device that cause the second media playback device to turn on and cause the media content item to be presented on the second media playback device at a second playback position.

In some implementations, the predetermined proximity is based on a device type of an associated media playback device.

In some implementations, the location information includes one or more signals from one or more wireless communication networks.

In some implementations, the location information includes information indicating a proximity of the mobile device to a non-media device at a fixed location.

In some implementations, the system further comprises: prior to causing the media content item to be presented on the second media playback device, means for determining whether the second media playback device is currently causing a second media content item to be presented.

In some implementations, the system further comprises: prior to transmitting the third instructions to the second media playback device, means for receiving information indicating feedback from a user associated with the mobile device related to previous interaction with the second media playback device; means for generating a probabilistic model based at least in part on the feedback that indicates a likelihood that the user wants the media content item to be presented on the second media playback device; and means for determining whether the likelihood is greater than a predetermined threshold.

In some implementations, the system further comprises: prior to transmitting the second instructions to the first media playback device, means for generating a probabilistic model indicating a likelihood that a user associated with the mobile device will remain within the predetermined proximity of the first media playback device within a predetermined time period; and means for determining whether the likelihood that the user of the mobile device will remain within the predetermined proximity of the first media playback device within the predetermined time period is less than a predetermined threshold.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms (which can include methods, systems, and media) for media playback are provided.

In some implementations, the mechanisms described herein can cause a media content item (e.g., audio content, video content, images, and/or any other suitable media content) to be presented on a particular media playback device (e.g., a television, a projector screen, and/or any other suitable media playback device) based on whether a mobile device associated with a user is within a predetermined proximity of the media playback device. In some implementations, the media playback device can be connected to a streaming media content device, and the mobile device can cause the streaming media content device to present a specified media content item on the corresponding media playback device. For example, in some implementations, the mobile device can transmit instructions to the streaming media content device that can specify a media content item and/or a playback position at which the media content item is to be presented. As another example, in some implementations, the mobile device can transmit data packets that include audio and/or video content of the media content item to the streaming media content device.

In some implementations, the mechanisms described herein can detect when the mobile device is no longer within the predetermined proximity of a first media playback device that is presenting a media content item and is within the predetermined proximity of a second media playback device. In response to this determination, the mechanisms can cause the media content item to no longer be presented on the first media playback device and to be presented on the second media playback device at the playback position at which presentation of the media content item was stopped on the first media playback device. Alternatively, in some implementations, the mechanisms described herein can determine that the media content item is to be presented on both the first media playback device and the second media playback device, for example, if it is determined that the mobile device is moving back and forth between rooms the two media playback devices are located in (e.g., if a user carrying the mobile device is moving between the two rooms).

In some implementations, the mechanisms described herein can generate probabilistic models to determine if a media content item is to be presented on a particular media playback device. In instances where a user consents to the use of data regarding the user's activity and/or feedback from the user, the probabilistic models can use any suitable information, such as feedback from a user, a current location of a mobile device, current movements of a mobile device and/or a user associated with the mobile device, the likelihood of a user being in a particular location and/or remaining in a particular location, and/or any other suitable information.

Figure 1A:
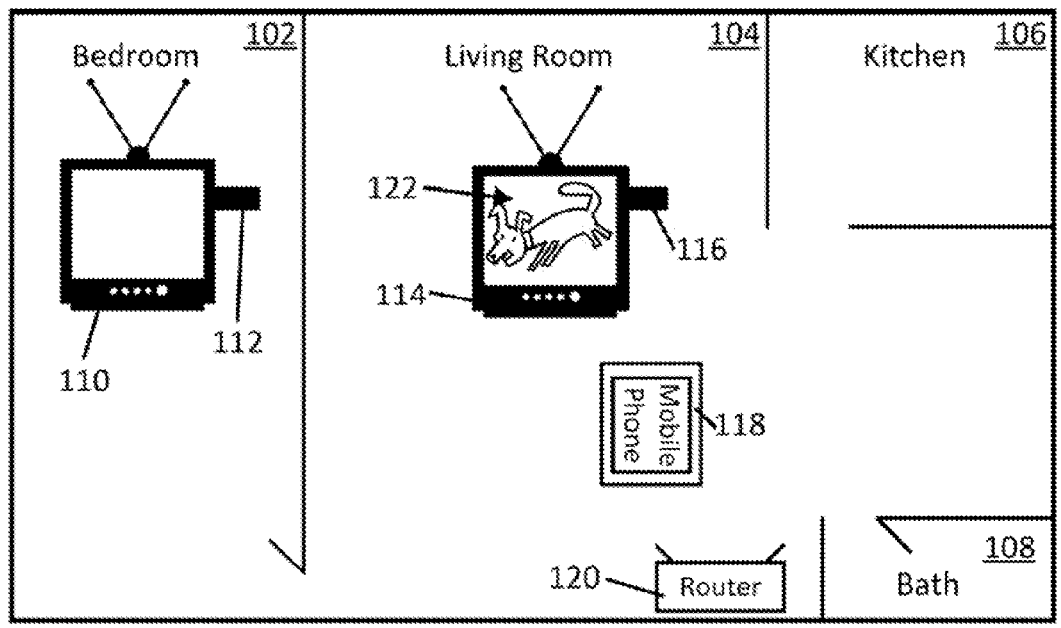
FIGS. 1A and 1B show an example of an illustrative layout of user devices in a user's home in accordance with some implementations of the disclosed subject matter.
Figure 1B:
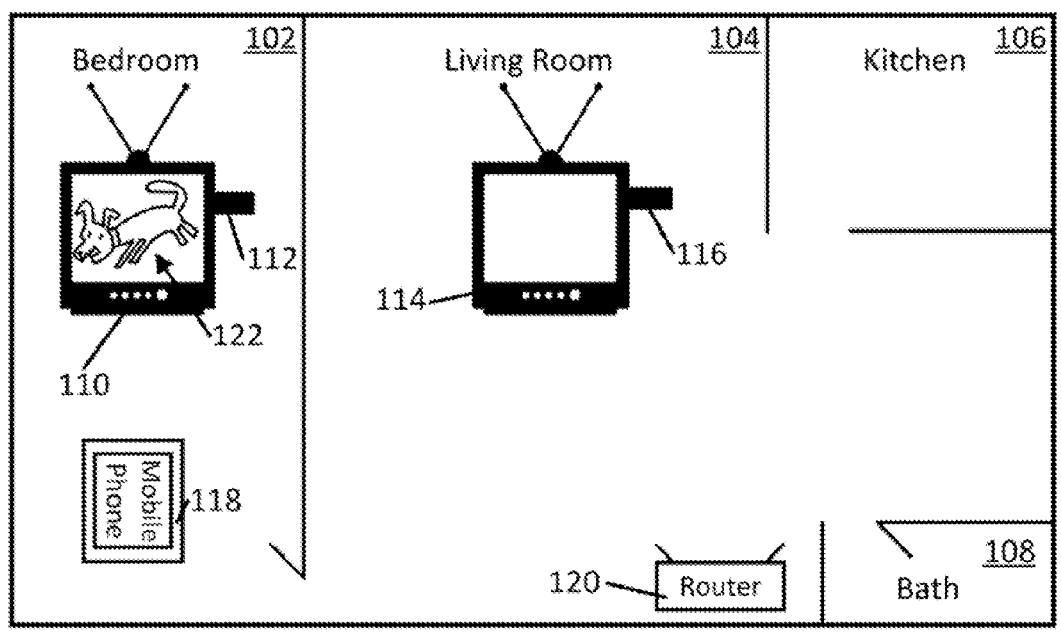

FIGS. 1A and 1B show an illustrative example of a layout of user devices in a user's home. In some implementations, the user's home can include multiple rooms, for example, a bedroom 102, a living room 104, a kitchen 106, and a bathroom 108. Although not shown in FIGS. 1A and 1B, in some embodiments, user devices can additionally or alternatively be located in external locations, such as a user's car, a user's office, and/or any other suitable location.

The user's home can contain one or more media playback devices (e.g., a television, a projector, a game console, a stereo, and/or any other suitable playback devices), such as television 110 in bedroom 102 and television 114 in living room 104.

In some implementations, televisions 110 and 114 can be connected to streaming media content devices 112 and 116, respectively. For example, in some implementations, streaming media content devices 112 and/or 116 can be connected to televisions 110 and 114, respectively, through High-Definition Multi-Media Interface (HDMI) ports on televisions 110 and 114. In some implementations, streaming media content devices 112 and/or 116 can be devices which can receive communications from a mobile device (e.g., mobile phone 118) through a communications network (e.g., a WiFi network, a BLUETOOTH network, and/or any other suitable communications network) and can cause media content to be presented on a corresponding media playback device (e.g., television 110 and/or 114) in response to the received communications. For example, in some implementations, a particular media content item can be selected on mobile phone 118 (e.g., from an application, in a web browser, and/or from any other suitable source), and mobile phone 118 can detect a nearby streaming media content device and can transmit information to the detected device indicating that the particular media content item is to be presented on a corresponding media playback device. In some implementations, a streaming media content device can cause any suitable media content to be presented (e.g., audio content, video content, images, and/or any other suitable content) using any suitable protocols (e.g., adaptive bitrate streaming, HTTP live streaming, and/or any other suitable protocols).

Note that, although streaming media content devices 112 and 116 are shown as separate devices from televisions 110 and 114, in some implementations, streaming media content devices 112 and 116 can be integrated within any suitable media playback device. Additionally or alternatively, in some implementations, actions performed by streaming media content devices 112 and 116, such as receiving information from a mobile device, causing a particular media content item to be presented on a media playback device, and/or any other suitable actions, can be performed instead by a media playback device, and, in some such implementations, streaming media content devices 112 and/or 116 can be omitted.

In some implementations, mobile phone 118 and streaming media content devices 112 and/or 116 can each be connected to a communication network through a router 120, which can be placed at any suitable location within the user's home. Note that although two televisions, two streaming media content devices, and one mobile device are shown in FIGS. 1A and 1B, in some implementations, any suitable number of devices of each type can be included.

As shown in FIG. 1A, in some implementations, the mechanisms described herein can cause a media content item 122 to begin being presented on television 114 in living room 104 in response to determining that mobile phone 118 is within a predetermined proximity range of television 114. In some implementations, the predetermined proximity range can include any suitable distance (e.g., one foot, two feet, ten feet, and/or any other suitable distance). In some implementations, the particular media content item which is to be presented can be selected on mobile phone 118 (e.g., by a user clicking, tapping, etc. an icon and/or link representing the media content item).

As shown in FIG. 1B, in some implementations, the mechanisms described herein can cause media content item 122 to begin being presented on a different media playback device, for example, television 110 in bedroom 102, in response to determining that mobile phone 118 is within a predetermined proximity range of television 110. In some implementations, the mechanisms can cause the media content item to no longer be presented on television 114 when presentation begins on television 110. Alternatively, in some implementations, the mechanisms can cause the media content item to simultaneously be presented on both television 110 and television 114, for example, in response to determining that a user is likely to be moving back and forth between bedroom 102 and living room 104, as described below in connection with FIG. 5.

Figure 2:
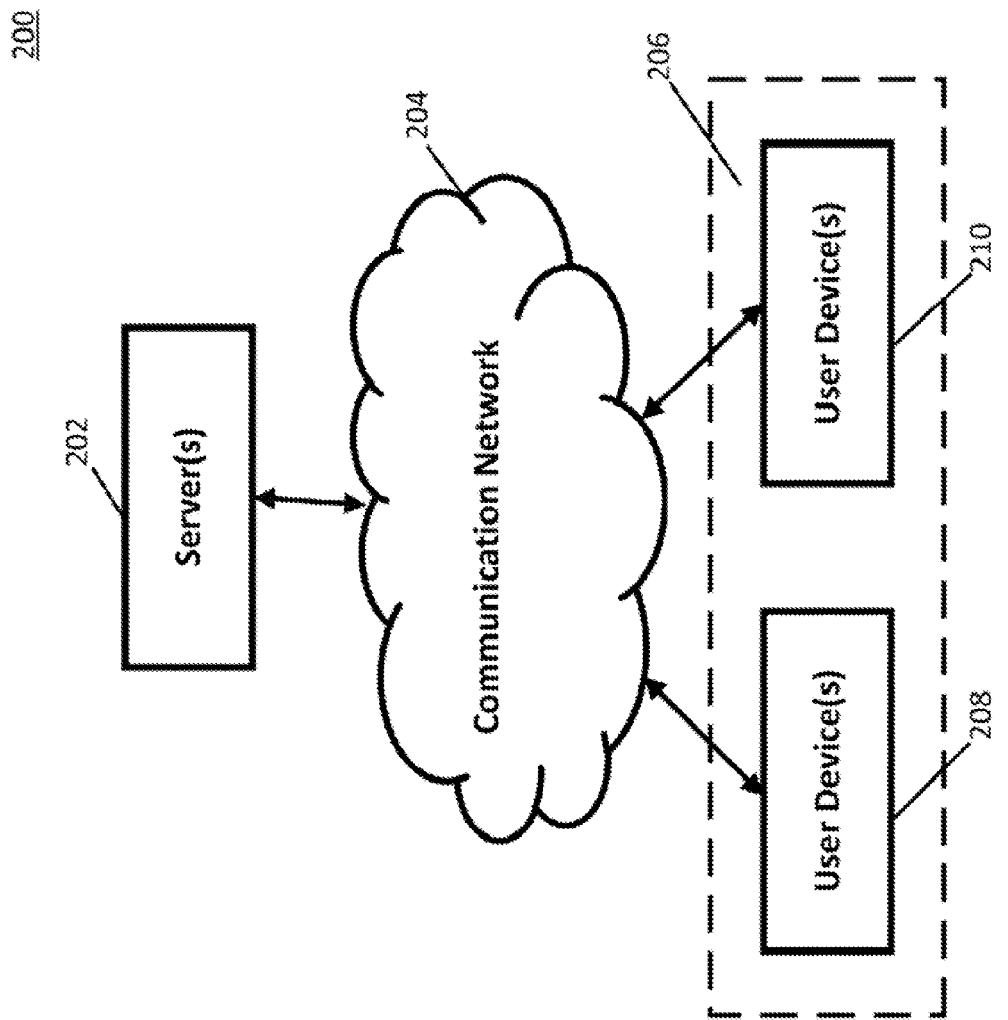
FIG. 2 shows a schematic diagram of an illustrative system suitable for implementation of mechanisms described herein for media playback in accordance with some implementations of the disclosed subject matter.

Turning to FIG. 2, an example 200 of hardware for media playback that can be used in accordance with some implementations of the disclosed subject matter is shown. As illustrated, hardware 200 can include one or more servers 202, a communication network 204, and/or one or more user devices 206, such as user devices 208 and 210.

Server(s) 202 can be any suitable server(s) for providing access to the mechanisms described herein for media playback, such as a processor, a computer, a data processing device, or any suitable combination of such devices. For example, in some implementations, server(s) 202 can receive and/or store feedback from a user. As a more particular example, in some implementations, server(s) 202 can receive and/or store feedback indicating which streaming media content devices and/or which media playback devices the user prefers to view media content items on. As another example, in some implementations, server(s) 202 can generate probabilistic models that indicate a likelihood that a user wants a media content item presented on a particular media playback device at a particular time. In some such implementations, server(s) 202 can use information related to feedback from the user to generate the probabilistic model.

Communication network 204 can be any suitable combination of one or more wired and/or wireless networks in some implementations. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to server(s) 202. The communications links can be any communications links suitable for communicating data among user devices 206 and server(s) 202 such as network links, dial-up links, wireless links, hard-wired links, any other suitable communications links, or any suitable combination of such links.

User devices 206 can include any one or more user devices suitable for receiving user input selecting a particular media content item for presentation, causing a media content item to be presented, detecting a proximity of the user device to one or more streaming media content devices, and/or any other suitable functions. For example, in some implementations, user devices 206 can include a mobile device, such as a mobile phone, a tablet computer, a wearable computer, a laptop computer, a vehicle (e.g., a car, a boat, an airplane, or any other suitable vehicle) entertainment system, and/or any other suitable mobile device, that can be used to cause a media content item to be presented on a media playback device. As another example, in some implementations, user devices 206 can include a media playback device, such as a television, a projector device, a game console, desktop computer, and/or any other suitable non-mobile device. As yet another example, in some implementations, user devices 206 can include a streaming media content device, as described above in connection with FIGS. 1A and 1B.

Although server(s) 202 is illustrated as one device, the functions performed by server(s) 202 can be performed using any suitable number of devices in some implementations. For example, in some implementations, multiple devices can be used to implement the functions performed by server(s) 202.

Although two user devices 208 and 210 are shown in FIG. 2 to avoid over-complicating the figure, any suitable number of user devices, and/or any suitable types of user devices, can be used in some implementations.

Figure 3:
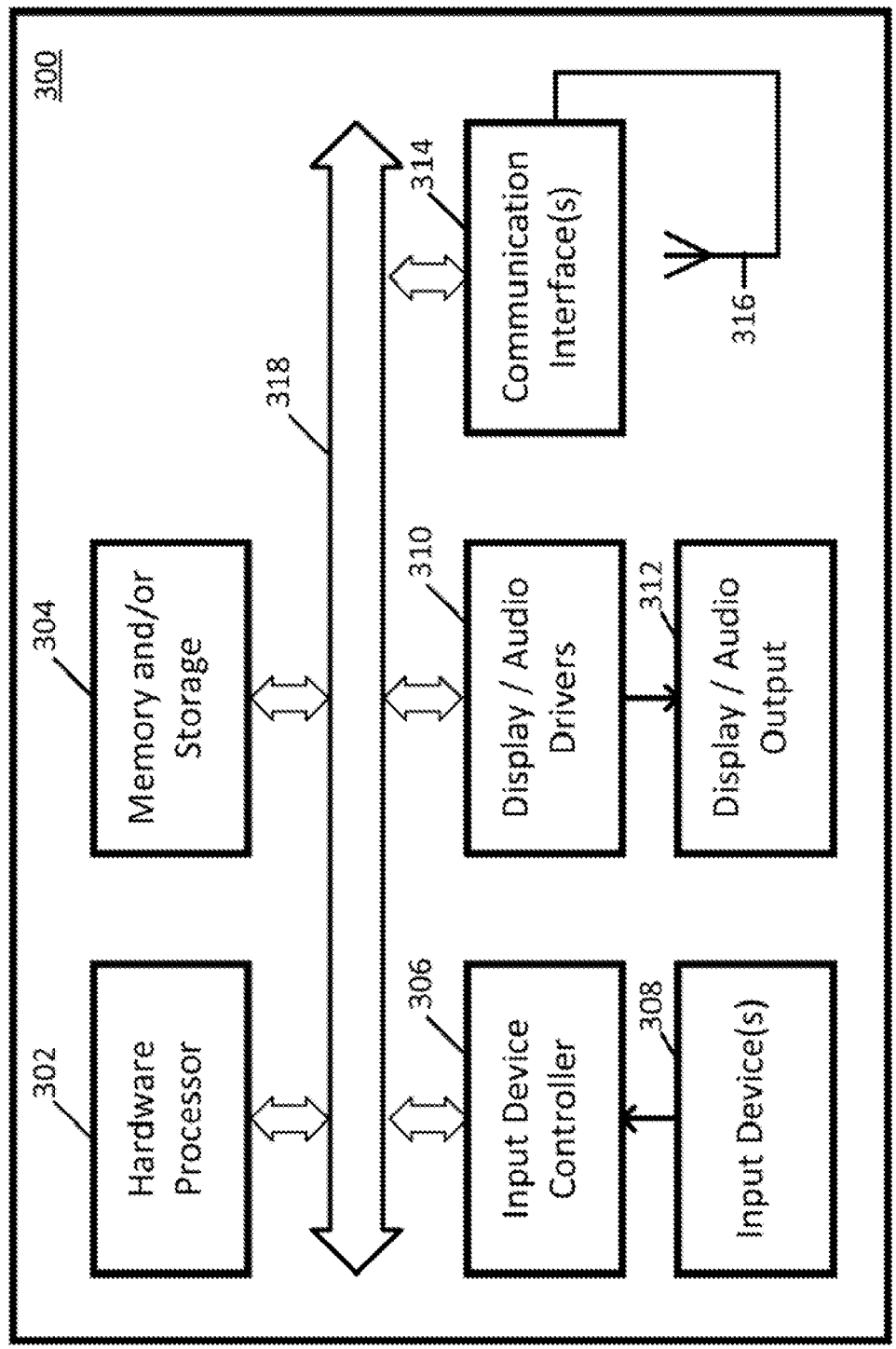
FIG. 3 shows a detailed example of hardware that can be used in a server and/or a user device of FIG. 2 in accordance with some implementations of the disclosed subject matter.

Server(s) 202 and user devices 206 can be implemented using any suitable hardware in some implementations. For example, in some implementations, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some implementations. In some implementations, hardware processor 302 can be controlled by a server program stored in memory and/or storage 304 of a server (e.g., such as one of server(s) 202). For example, in some implementations, the server program can cause hardware processor 302 to stored received information relating to a user's feedback in memory 304. In some implementations, hardware processor 302 can be controlled by a computer program stored in memory and/or storage 304 of user device 206. For example, the computer program can cause hardware processor 302 to transmit instructions to a streaming media content device that cause a media playback device to turn on and/or present a particular media content item, detect a location of the user device, detect a proximity of the user device to a streaming media content device, and/or perform any other suitable actions.

Memory and/or storage 304 can be any suitable memory and/or storage for storing programs, data, media content, and/or any other suitable information in some implementations. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some implementations. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some implementations. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 210 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 206) in some implementations. In some implementations, antenna 316 can be omitted.

Bus 318 can be any suitable mechanism for communicating between two or more components 302, 304, 306, 310, and 314 in some implementations.

Any other suitable components can be included in hardware 300 in accordance with some implementations.

Figure 4:
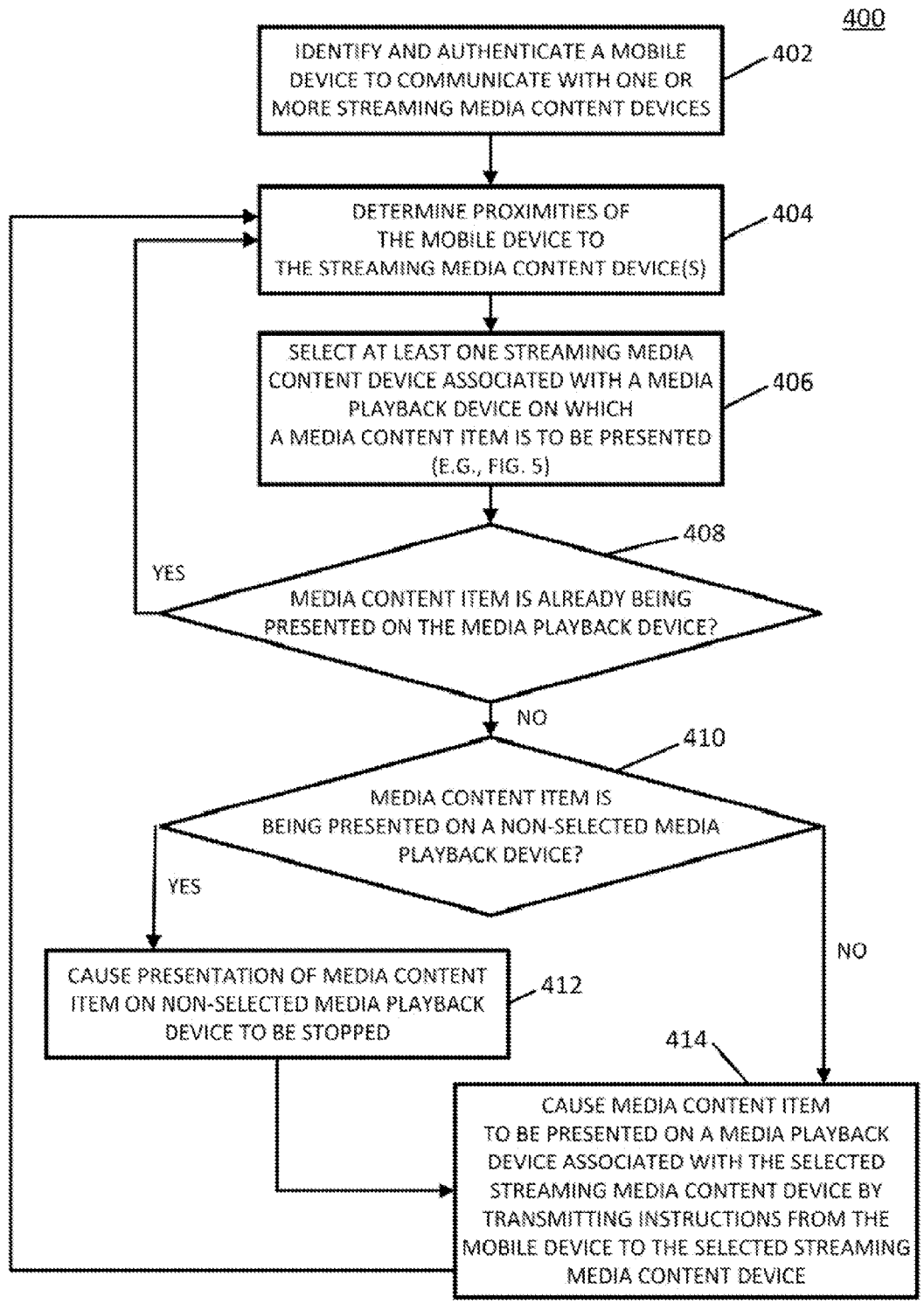
FIG. 4 shows an example of a process for causing a media playback device to present a media content item based on a detected proximity of a mobile device to the media playback device in accordance with some implementations of the disclosed subject matter.

Turning to FIG. 4, an example 400 of a process for causing a media playback device to present a media content item based on a detected proximity of a mobile device to the media playback device is illustrated in accordance with some implementations of the disclosed subject matter.

Process 400 can begin by identifying one or more streaming media content devices (e.g., streaming media content device 112 and/or 116 as shown in and described above in connection with FIGS. 1A and 1B) and authenticating the mobile device to communicate with the streaming media content devices at 402.

Process 400 can identify the one or more streaming media content devices using any suitable techniques or combination of techniques. For example, in some implementations, process 400 can query a network (e.g., a WiFi network, a BLUETOOTH network, and/or any other suitable type of network) to which the streaming media content device(s) are connected, requesting a list of the steaming media content devices connected to the network. In some implementations, process 400 can further determine a location associated with each of the identified streaming media content devices. For example, process 400 can determine that streaming media content device 112 of FIGS. 1A and 1B is in bedroom 102. The location can be determined using any suitable technique or combination of techniques. For example, in some implementations, process 400 can receive user input indicating the location (e.g., a user explicitly indicates that streaming media content device 112 is in bedroom 102), and process 400 can save the indicated location for future use. As another example, in some implementations, process 400 can implicitly determine a location based on a user's pattern of movements. As a more particular example, in some implementations, process 400 can determine that streaming media content device 112 is in a bedroom based on information over any suitable time period (e.g., over a week, over a month, and/or any other suitable time period) indicating that a user tends to view media content via streaming media content device 112 and/or media playback device 110 during particular times of a day (e.g., after 10 p.m., before 7 a.m., and/or any other suitable times). In some implementations, the user's pattern of movements can be determined based on information from one or more user devices other than the mobile device, such as wearable computers, laptop computers, and/or any other suitable devices. In some such implementations, information from these other user devices can accessed through an account the user has synchronized across devices.

Process 400 can authenticate the mobile device and/or receive an indication of previous authentication based on any suitable information. For example, in some implementations, process 400 can determine that the mobile device and the streaming media content device(s) are associated with a particular user account, and that a user associated with the particular user account has consented to association of the mobile device with the streaming media content device(s). As a more particular example, in some implementations, process 400 can further determine that the mobile device and the streaming media content device(s) are logged into the user account using a particular communication network, for example, a wireless local area network established within the user's home.

In some implementations, process 400 can use any suitable protocol(s) to identify streaming media content devices on a particular network and/or authenticate the mobile device with the identified streaming media content devices. For example, in some implementations, process 400 can use a Discovery and Launch (DIAL) Service Discovery protocol to detect and identify streaming media content devices on a local network (e.g., a local WiFi network within a user's home).

Process 400 can determine proximities of the mobile device to a collection of candidate streaming media content device(s) (or to a media playback device to which a streaming media content device is connected) at 402. In some implementations, process 400 can determine a proximity of the mobile device to any suitable number (e.g., one, two, three, and/or any other suitable number) of streaming media content devices. Process 400 can determine the proximities using any suitable technique or combination of techniques. For example, in some implementations, process 400 can determine the proximity of the mobile device to a particular streaming media content device using the signal strength of connections to a common network. As a more particular example, in some implementations, the proximity can be determined by comparing the signal strength of the mobile device to the common network with the signal strength of the streaming media content device to the common network. More specifically, in response to determining that the mobile device has a strong connection to a particular router (e.g., router 120 of FIGS. 1A and 1B), and that the streaming media content device has a substantially weaker connection to the same router, process 400 can determine that there is poor proximity between the mobile device and the streaming media content device. In some implementations, process 400 can estimate a distance between the mobile device and the streaming media content device based on the difference in signal strengths.

As another example, in some implementations, process 400 can determine a proximity between the mobile device and a streaming media content device by determining a location of the mobile device and comparing the location of the mobile device to a known location of another device. As a more particular example, in some implementations, process 400 can determine that the mobile device is in a living room, and that it is therefore in close proximity to a streaming media content device known to be in the living room (e.g., based on the identification of the streaming media content device at block 402).

Process 400 can determine a location of the mobile device using any suitable technique or combination of techniques. For example, in some implementations, process 400 can estimate a distance of the mobile device to a non-media device positioned at a fixed location (e.g., a thermostat, a smoke detector, an interior and/or exterior lock, and/or any other suitable device). As a more particular example, in some implementations, process 400 can determine that a strength of a connection (e.g., a WiFi connection, a BLUETOOTH connection, and/or any other suitable type of connection) to a thermostat known to be in the living room is relatively strong, and process 400 can therefore determine that the mobile device is within a particular proximity range of a streaming media content device in the living room. In some implementations, the known locations of any suitable number (e.g., one, two, three, and/or any other suitable number) of devices can be used to determine a location of the mobile device. For example, in some implementations, process 400 can triangulate a position of the mobile device based on the locations of two other devices (e.g., a thermostat and a smoke detector, and/or any other suitable devices). In some implementations, a location of the mobile device can be determined based at least partially on any other suitable information, such as Global Positioning System (GPS) information.

Process 400 can select at least one streaming media content device that is to cause a media content item to be presented at 406. In some implementations, process 400 can select the streaming media content device in response to receiving a request to present a particular media content item on a media playback device connected to a streaming media content device (e.g., when a user selects the particular media content item and/or a link to the particular media content item on a mobile device). Process 400 can select at least one streaming media content device using any suitable technique or combination of techniques. For example, in some implementations, the selection can be based at least in part on the proximity of the mobile device to each of the candidate streaming media content devices, as determined in block 404. As a more particular example, in some implementations, process 400 can select a streaming media content device if it is determined to be within a predetermined proximity (e.g., within two feet, within five feet, within ten feet, and/or any other suitable proximity) of the mobile device. In some implementations, the predetermined proximity can be determined based on a device type associated with a media playback device connected to the streaming media content device and/or a location associated with the streaming media content device. For example, in some implementations, the predetermined proximity can be smaller if the location of the streaming media content device is in a car compared to if the location is in a bedroom. An another more particular example, in some implementations, process 400 can select the streaming media content device based on additional factors, such as a user's feedback, a probabilistic model of whether a user will remain in a current location, and/or any other suitable criteria, as described below in connection with FIG. 5.

Process 400 can determine if a media content item is already being presented by a media playback device associated with the selected streaming media content device at 408. For example, in some implementations, process 400 can determine that a media content item is being streamed to the selected streaming media content device from another mobile device. As another example, in some implementations, process 400 can determine that the particular media content item selected on the mobile device is already being presented on a media playback device associated with the selected streaming media content device. Process 400 can determine what, if any, media content is being presented on a media playback device associated with the selected streaming media content device using any suitable technique or combination of techniques. For example, in some implementations, process 400 can analyze sound input acquired through a microphone associated with the mobile device to determine if any media content is being presented. As another example, in some implementations, process 400 can query the selected streaming media content device via communication network 204 to determine if it is currently in use.

If, at 408, process 400 determines that a media content item is already being presented on a media playback device associated with the selected streaming media content device ("yes" at 408), process 400 can loop back to 404 and can determine proximities of the mobile device to one or more other streaming media content devices.

If, at 408, process 400 determines that media content is not being presented on a media playback device associated with the selected streaming media content device(s) ("no" at 408), process 400 can determine if the particular media content item selected on the mobile device is currently being presented on a media playback device associated with a non-selected streaming media content device at 410 using any suitable technique or combination of techniques. For example, in some implementations, process 400 can determine whether hardware processor 302 on the mobile device is currently causing the media content item to be streamed to a non-selected streaming media content device.

If, at 410, process determines that the media content item is not being presented on a media playback device associated with a non-selected streaming media content device ("no" at 410), process 400 can proceed to block 414.

If, at 410, process 400 determines that the media content item is being presented on a media playback device associated with a non-selected streaming media content device ("yes" at 410), process 400 can cause the media content item to no longer be presented on the media playback device at 412 using any suitable technique or combination of techniques. For example, in some implementations, process 400 can cause the mobile device to stop sending data related to the media content item to the non-selected streaming media content device. As another example, in some implementations, process 400 can cause an application running on the non-selected streaming media content device that is causing the media content item to be presented on a corresponding media playback device to be terminated. In some implementations, process 400 can save an indication of a playback position in the media content item at which presentation of the media content item on the media playback device was terminated. Furthermore, in some implementations, after causing the media content item to no longer be presented, process 400 can cause a media playback device associated with the non-selected streaming media content device to be turned off using any suitable technique or combination of techniques. For example, in some implementations, process 400 can use the mobile device to turn off the media playback device presenting the media content item using an infrared port on the mobile device.

Process 400 can then cause the media content item to be presented on a media playback device associated with the selected streaming media content device at 414. In some implementations, process 400 can cause a media playback device associated with the selected streaming media content device to turn on before causing the media content item to be presented using any suitable technique or combination of techniques. For example, in some implementations, process 400 can cause the mobile device to send instructions to the selected streaming media content device that can cause the selected streaming media content device to turn on the associated media playback device via communication through an HDMI port through which the selected streaming media content device and the media playback device are connected. As another example, in some implementations, process 400 can cause the media playback device to turn on via an infrared port on the mobile device.

Process 400 can cause the media content item to be presented on a media playback device associated with the selected streaming media content device using any suitable technique or combination of techniques. For example, in some implementations, the mobile device can transmit instructions to the selected streaming media content device that can indicate the media content item to be presented and/or a playback position at which the media content item is to be presented. As a more particular example, in some implementations, the transmitted instructions can include a uniform resource locator (URL) at which the media content item is stored. In some such implementations, the streaming media content device can locate the specified media content item based on the received instructions and can then cause the specified media content item to be presented on an associated media playback device.

As another example, in some implementations, the mobile device can send the media content item to the streaming media content device via a communication network within the user's home (e.g., a WiFi network, a BLUETOOTH network, and/or any other suitable network). In some implementations, any suitable protocol can be used to transfer data associated with the selected media content item from the mobile device to the streaming media content device, such as adaptive bitrate streaming, HTTP live streaming, user datagram protocol (UDP), and/or any other suitable protocol. The selected streaming media content device can then cause the media content item to be presented on an associated media playback device. In some implementations, the selected streaming media content device can store and received information in a buffer before and/or during presentation of the media content item on the corresponding media playback device.

In some implementations, process 400 can present a user interface on the mobile device that can request confirmation from a user that the media content is to be presented on a media playback device associated with the selected streaming media content device. In some implementations, input received from the user interface can be saved (e.g., in memory 304 of server(s) 202) as user feedback for future selections of streaming media content devices, for example, as described below in connection with FIG. 5.

After causing the selected media content item to be presented on a media playback device associated with the selected streaming media content device, process 400 can loop back to block 404 and can determine relative proximities of the mobile device to other streaming media content devices.

Figure 5:
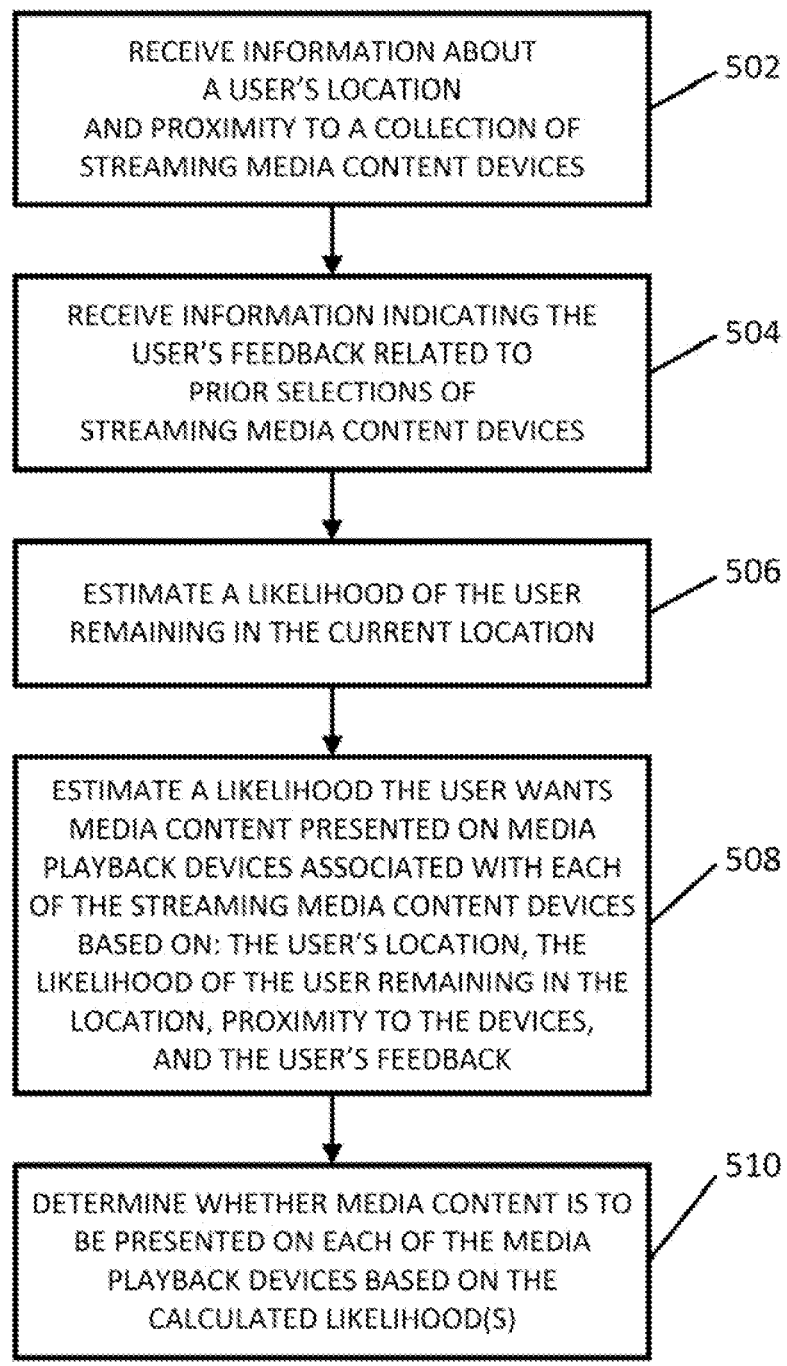
FIG. 5 shows an example of a process for selecting media playback devices on which to present a media content item in accordance with some implementations of the disclosed subject matter.

Turning to FIG. 5, an example 500 of a process for determining whether a media content item is to be presented on media playback devices associated with each of a collection of streaming media content devices in accordance with some implementations of the disclosed subject matter is shown.

Process 500 can begin by receiving information indicating the location of a mobile device and/or a proximity of the mobile device to a collection of streaming media content devices at 502. In some implementations, the collection of streaming media content devices can include all known streaming media content devices within the user's home, and/or any suitable subset of the known streaming media content devices. The received information can indicate any suitable information relating to the location of the mobile device and/or the proximity of the mobile device to the streaming media content devices. For example, in some implementations, the received information can indicate that the mobile device is in in a particular room, that the mobile device is within a predetermined proximity of a particular streaming media content device, that the mobile device is a particular distance from a non-media device (e.g., a thermostat, a smoke detector, a lock on a door, and/or any other suitable non-media device), that the mobile device has been moved outside the user's home, and/or any other suitable information. In some implementations, the received information can indicate a current movement pattern associated with the mobile device. For example, the received information can indicate that the mobile device is currently being moved back and forth between, for example, a laundry room and a bedroom. In some such implementations, the current movement pattern can be determined based on information from any suitable source, such as an accelerometer (e.g., on the mobile device, on a wearable computer and/or activity tracker, and/or any other suitable device), GPS information, and/or any other suitable source.

Process 500 can receive information indicating feedback relating to the user's previous interactions with one or more of the streaming media content devices. The received information can include any suitable interactions over any suitable time period (e.g., within the past day, within the past week, within the past month, and/or any other suitable time period). For example, in some implementations, the received information can indicate a number of times (e.g., total, within the past day, within the past week, and/or over any other suitable time period) that after process 400 caused a media content item to be presented on a television in a user's living room, the presentation of media content has been stopped and/or the television has been turned off. As another example, the received information can indicate a number of times a media content item has been presented on a particular device (e.g., a television in the user's bedroom). In some implementations, the received information can be filtered based on a day of the week, a time of day, and/or any other suitable information. For example, the received information can indicate a user's interactions with a particular streaming media content device and/or a particular media playback device on weekdays, weekends, weekdays after 6 p.m., and/or any other suitable filtering criteria.

Note that, in some implementations, information relating to the user's previous interactions with media playback devices and/or streaming media content devices is received only in instances where the user has consented to use of such information. For example, in some implementations, consent may be obtained via settings accessible through a user account associated with the mobile device and/or the streaming media content devices.

Process 500 can estimate a likelihood of the mobile device and/or a user associated with the mobile device remaining in the current location at 506 using any suitable information. For example, in some implementations, process 500 can estimate the likelihood based on an identity of the location, a time of day, and/or any other suitable information or combination of information. As a more particular example, if the location was determined to be a bathroom (e.g., from the information received at block 502), process 500 can estimate that the user is unlikely (e.g., with less than 50% probability, with less than 30% probability, and/or any other suitable probability) to remain in the current location for more than a particular period of time (e.g., more than five minutes, more than ten minutes, and/or any other suitable information). As another more particular example, if the location was determined to be a bedroom, and the time of day is after midnight, process 500 can determine that the user is likely (e.g., with more than 50% probability, with more than 70% probability, and/or any other suitable probability) to remain in the current location for more than a particular time period (e.g., more than an hour, more than two hours, and/or any other suitable time period).

Process 500 can estimate the likelihood using any suitable technique or combination of techniques. For example, in some implementations, process 500 can generate a probabilistic model that outputs a probability of the user being in a particular location for an input including a location, a time of day, and a time period of interest. The probabilistic model can be generated using any suitable technique. For example, in some implementations, the model can be iteratively trained using information relating to a user's movement patterns with respect to location and time of day.

Process 500 can estimate a likelihood that the user wants a media content item presented on media playback devices associated with each of the streaming media content devices in the collection at 508. In some implementations, process 500 can generate a probabilistic model that estimates a likelihood that the user wants a particular media content item to be presented using a particular streaming media content device based on the user's current location and/or a current location of a mobile device associated with the user, the likelihood of the user and/or the mobile device remaining in the current location (e.g., as determined at block 506), proximity to the streaming media content device, a user's current movements (e.g., if the user and/or the mobile device is moving back and forth between two rooms), and feedback from the user (e.g., as described above in connection with block 504).

Process 500 can determine whether media content is to be presented using each of the streaming media content devices in the collection at 510 based on the likelihoods estimated at 508. Process 500 can determine that the media content is to be presented using a particular streaming media content device using any suitable criteria. For example, in some implementations, process 500 can determine that the media content is to be presented using a particular streaming media content device if the likelihood that the user wants the media content to be presented using the particular streaming media content device exceeds a predetermined threshold (e.g., the likelihood is greater than 50%, the likelihood is greater than 70%, and/or any other suitable threshold). In some implementations, process 500 can determine that media content is to be presented using any suitable number of streaming media content devices (e.g., one, two, three, and/or any other suitable number). For example, in some implementations, process 500 can determine that media content is to be presented using streaming media content devices associated with televisions in both a bedroom and a laundry room, for example, if the probabilistic model indicates that it is likely the user wants the media content presented in both locations (e.g., if the user is moving back and forth between the two rooms).

In some implementations, process 500 can determine that the media content should not be presented on any device at the current time. For example, in some implementations, process 500 can determine that a presentation of media content on a particular media playback device is to be paused for a predetermined period of time. As a more particular example, in instances where process 500 determines that a user is not within a predetermined proximity of a streaming media content device that is causing media content to be presented on a media playback device, but is likely to return (e.g., based on the probabilistic model described in connection with block 508) within a particular time range (e.g., within the next minute, within the next five minutes, and/or any other suitable time range), process 500 can determine that presentation of the media content item is to be paused until the user is within the predetermined proximity again. As another example, in some implementations, process 500 can determine that the current location of a user and/or a mobile device associated with the user is outside of the user's home, and that media content should therefore not be presented on any media playback devices within the user's home. As a more particular example, in some implementations, process 500 can determine that a user has recently left the user's home and that presentation of a media content item that is currently being presented should be stopped.

In some implementations, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for media playback are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for media playback, the method comprising:
receiving an indication that a mobile device is associated with a plurality of media playback devices over a wireless communications network, wherein the mobile device and the plurality of media playback devices are authenticated with a user account;
receiving location information indicating relative proximities of the mobile device with each of the media playback devices;
receiving a request to present a media content item on at least one of the plurality of media playback devices;
determining that the mobile device is within a predetermined proximity of a first media playback device of the plurality of media playback devices based on the received location information;
in response to determining that the mobile device is within the predetermined proximity of the first media playback device, transmitting first instructions to the first media playback device that cause the first media playback device to turn on and cause the media content item to be presented on the first media playback device at a first playback position;
determining, at a second playback position during the playback of the media content item on the first media playback device, that the mobile device is within the predetermined proximity of a second media playback device and is no longer within the predetermined proximity of the first media playback device based on the received location information; and in response to determining that the mobile device is within the predetermined proximity of the second media playback device and is no longer within the predetermined proximity of the first media playback device, transmitting second instructions to the first media playback device that cause the first media playback device to stop presenting the media content item and third instructions to the second media playback device that cause the second media playback device to turn on and cause the media content item to be presented on the second media playback device at a second playback position.

2. The method of claim 1, wherein the predetermined proximity is based on a device type of an associated media playback device.

3. The method of claim 1, wherein the location information includes one or more signals from one or more wireless communication networks.

4. The method of claim 1, wherein the location information includes information indicating a proximity of the mobile device to a non-media device at a fixed location.

5. The method of claim 1, further comprising, prior to causing the media content item to be presented on the second media playback device, determining whether the second media playback device is currently causing a second media content item to be presented.

6. The method of claim 1, further comprising:
prior to transmitting the third instructions to the second media playback device, receiving information indicating feedback from a user associated with the mobile device related to previous interaction with the second media playback device;
generating a probabilistic model based at least in part on the feedback that indicates a likelihood that the user wants the media content item to be presented on the second media playback device; and
determining whether the likelihood is greater than a predetermined threshold.

7. The method of claim 1, further comprising:
prior to transmitting the second instructions to the first media playback device, generating a probabilistic model indicating a likelihood that a user associated with the mobile device will remain within the predetermined proximity of the first media playback device within a predetermined time period; and
determining whether the likelihood that the user of the mobile device will remain within the predetermined proximity of the first media playback device within the predetermined time period is less than a predetermined threshold.

8. A system for media playback, the system comprising:
a hardware processor that is programmed to:
receive an indication that a mobile device is associated with a plurality of media playback devices over a wireless communications network, wherein the mobile device and the plurality of media playback devices are authenticated with a user account;
receive location information indicating relative proximities of the mobile device with each of the media playback devices;
receive a request to present a media content item on at least one of the plurality of media playback devices;
determine that the mobile device is within a predetermined proximity of a first media playback device of the plurality of media playback devices based on the received location information;
in response to determining that the mobile device is within the predetermined proximity of the first media playback device, transmit first instructions to the first media playback device that cause the first media playback device to turn on and cause the media content item to be presented on the first media playback device at a first playback position;
determine, at a second playback position during the playback of the media content item on the first media playback device, that the mobile device is within the predetermined proximity of a second media playback device and is no longer within the predetermined proximity of the first media playback device based on the received location information; and
in response to determining that the mobile device is within the predetermined proximity of the second media playback device and is no longer within the predetermined proximity of the first media playback device, transmit second instructions to the first media playback device that cause the first media playback device to stop presenting the media content item and third instructions to the second media playback device that cause the second media playback device to turn on and cause the media content item to be presented on the second media playback device at a second playback position.

9. The system of claim 8, wherein the predetermined proximity is based on a device type of an associated media playback device.

10. The system of claim 8, wherein the location information includes one or more signals from one or more wireless communication networks.

11. The system of claim 8, wherein the location information includes information indicating a proximity of the mobile device to a non-media device at a fixed location.

12. The system of claim 8, wherein the hardware processor is further programmed to, prior to causing the media content item to be presented on the second media playback device, determine whether the second media playback device is currently causing a second media content item to be presented.

13. The system of claim 8, wherein the hardware processor is further programmed to:
prior to transmitting the third instructions to the second media playback device, receive information indicating feedback from a user associated with the mobile device related to previous interaction with the second media playback device;
generate a probabilistic model based at least in part on the feedback that indicates a likelihood that the user wants the media content item to be presented on the second media playback device; and
determine whether the likelihood is greater than a predetermined threshold.

14. The system of claim 8, wherein the hardware processor is further programmed to:
prior to transmitting the second instructions to the first media playback device, generate a probabilistic model indicating a likelihood that a user associated with the mobile device will remain within the predetermined proximity of the first media playback device within a predetermined time period; and
determine whether the likelihood that the user of the mobile device will remain within the predetermined proximity of the first media playback device within the predetermined time period is less than a predetermined threshold.

15. A non-transitory computer-readable medium containing computer executable instructions that, when executed by a processor, cause the processor to perform a method for media playback, the method comprising:
 receiving an indication that a mobile device is associated with a plurality of media playback devices over a wireless communications network, wherein the mobile device and the plurality of media playback devices are authenticated with a user account;
 receiving location information indicating relative proximities of the mobile device with each of the media playback devices;
 receiving a request to present a media content item on at least one of the plurality of media playback devices;
 determining that the mobile device is within a predetermined proximity of a first media playback device of the plurality of media playback devices based on the received location information;
 in response to determining that the mobile device is within the predetermined proximity of the first media playback device, transmitting first instructions to the first media playback device that cause the first media playback device to turn on and cause the media content item to be presented on the first media playback device at a first playback position;
 determining, at a second playback position during the playback of the media content item on the first media playback device, that the mobile device is within the predetermined proximity of a second media playback device and is no longer within the predetermined proximity of the first media playback device based on the received location information; and
 in response to determining that the mobile device is within the predetermined proximity of the second media playback device and is no longer within the predetermined proximity of the first media playback device, transmitting second instructions to the first media playback device that cause the first media playback device to stop presenting the media content item and third instructions to the second media playback device that cause the second media playback device to turn on and cause the media content item to be presented on the second media playback device at a second playback position.

16. The non-transitory computer-readable medium of claim 15, wherein the predetermined proximity is based on a device type of an associated media playback device.

17. The non-transitory computer-readable medium of claim 15, wherein the location information includes one or more signals from one or more wireless communication networks.

18. The non-transitory computer-readable medium of claim 15, wherein the location information includes information indicating a proximity of the mobile device to a non-media device at a fixed location.

19. The non-transitory computer-readable medium of claim 15, wherein the method further comprises, prior to causing the media content item to be presented on the second media playback device, determining whether the second media playback device is currently causing a second media content item to be presented.

20. The non-transitory computer-readable medium of claim 15, wherein the method further comprises:
 prior to transmitting the third instructions to the second media playback device, receiving information indicating feedback from a user associated with the mobile device related to previous interaction with the second media playback device;
 generating a probabilistic model based at least in part on the feedback that indicates a likelihood that the user wants the media content item to be presented on the second media playback device; and
 determining whether the likelihood is greater than a predetermined threshold.

21. The non-transitory computer-readable medium of claim 15, wherein the method further comprises:
 prior to transmitting the second instructions to the first media playback device, generating a probabilistic model indicating a likelihood that a user associated with the mobile device will remain within the predetermined proximity of the first media playback device within a predetermined time period; and
 determining whether the likelihood that the user of the mobile device will remain within the predetermined proximity of the first media playback device within the predetermined time period is less than a predetermined threshold.

* * * * *